United States Patent [19]

Krol

[11] Patent Number: 4,491,181

[45] Date of Patent: Jan. 1, 1985

[54] METHOD OF FREEING STUCK DRILL STRING USING SPOTTING FLUID

[75] Inventor: David A. Krol, Pittsburgh, Pa.

[73] Assignee: Gulf Research and Development Co., Pittsburgh, Pa.

[21] Appl. No.: 480,877

[22] Filed: Mar. 31, 1983

[51] Int. Cl.³ .............................................. E21B 31/00
[52] U.S. Cl. ...................................... 166/301; 175/65
[58] Field of Search ................... 166/301, 280; 175/65; 252/8.5 C, 8.5 P, 8.55 R

[56] References Cited

U.S. PATENT DOCUMENTS

| | | | |
|---|---|---|---|
| 3,216,933 | 11/1965 | Park et al. | 252/8.5 |
| 4,063,603 | 12/1977 | Rayborn | 175/65 |
| 4,068,718 | 1/1978 | Cooke, Jr. et al. | 166/280 |
| 4,123,367 | 10/1978 | Dodd | 175/65 X |

OTHER PUBLICATIONS

Outmans, "Spot Fluid Quickly to Free Differentially Stuck Pipe", *The Oil and Gas Journal*, (Jul. 15, 1974), pp. 65–68.
Adams, "How to Control Differential Pipe Sticking", *Petroleum Engineer*, (Sep., 1977), pp. 32, 34 and 40; (Oct., 1977), pp. 40, 44 and 46.
"Million-dollar Misunderstanding Catapults Salesman to President", *Drill Bit*, (Jul. 1982), pp. 68 and 69.
Krol, "Laboratory Evaluation of Stuck Pipe Fluid Effectiveness", SPE 10096, paper presented at 56th Annual Fall Tech. Conference of Society of Petroleum Engineers of AIME, San Antonio, Tex., Oct. 5–7, 1981, 13 pp.

*Primary Examiner*—George A. Suchfield
*Attorney, Agent, or Firm*—Roylance, Abrams, Berdo & Goodman

[57] ABSTRACT

A spotting fluid comprising an oily material containing a solid spotting agent, said solid spotting agent comprising at least 20 weight percent of said oily material and at least 32 pounds per barrel of said solid spotting agent, said solid spotting agent comprising substantially spherical particles having a specific gravity of at least 2.0, an average particle diameter below 212 microns, and a compressive strength of at least 5000 psi is used to free a differentially stuck drill string.

18 Claims, No Drawings

METHOD OF FREEING STUCK DRILL STRING USING SPOTTING FLUID

BACKGROUND OF THE INVENTION

This invention relates to a method for freeing drill string stuck in a well bore. More particularly, this invention relates to a method of using a spotting fluid containing solid spotting agents to free a drill string stuck in a well bore by differential pressure effects.

In drilling operations, a string of drill pipe having a drill bit mounted on the lower end thereof is caused to rotate to permit the cutting elements or "teeth" on the drill bit to drill through the formation. Drilling fluid is continuously circulated through the drill pipe and passes through openings in the drill bit, thereafter returning to the surface in the annular space between the drill string and walls of the bore hole carrying drill cuttings from the hole. Frequently, the drill string becomes stuck and cannot be rotated or removed from the hole. Stuck pipe occurs when the force required to pull the drill string from the hole exceeds the maximum allowable tensile strength of the string. One form of sticking is called differential pressure sticking. In that section of the hole where the formation is permeable, a filter cake is formed due to the difference in pressure between the hydrostatic head of the mud column and the formation. If a portion of the drill string imbeds itself in the filter cake, the differential pressure acts on the area of drill string in contact with the filter cake to stick the pipe against the borehole wall.

Various proposals have been made to prevent drill pipe from sticking including methods of reducing torque and drag using various lubricant additives in the drilling fluid. However, when pipe movement has to be interrupted during a drilling operation, there is the potential risk of sticking, despite all precautions. The problem is to then free the stuck drill string. Various techniques have been utilized in an attempt to free a differentially stuck drill string, including mechanical methods, hydrostatic reductions and spotting fluids.

Spotting fluids have been used to cover that section of a well in which the pipe is stuck in an attempt to release it. It is theorized that the spotting fluid will penetrate, or actually destroy the filter cake which has sealed the drill string or will release pipe by a lubricating mechanism. Commercial spotting fluids have been either the oil-base or inverted-oil-emulsion type fluid spiked with chemicals for viscosity control, gel stability, wetability and water loss and are weighted with barite to prevent migration as mentioned in Outmans, "The Oil and Gas Journal", July 15, 1974, pp. 65–68, the disclosure of which is hereby incorporated by reference.

It would be highly desirable to provide an improved spotting fluid which reduces frictional resistance and which improves lubrication of the stuck drill pipe.

SUMMARY OF THE INVENTION

It has now been found that drill pipe stuck in a well bore because of differential pressure effects can be more easily freed by using a spotting fluid having the characteristics of an oil base liquid comprising an oily material containing a solid spotting agent, said solid spotting agent comprising at least 20 weight percent of said oily material and at least 32 pounds per barrel of said solid spotting agent, said solid spotting agent comprising substantially spherical particles having a specific gravity of at least 2.0, an average particle diameter below 212 microns, and a compressive strength of at least 5000 psi. Surprisingly, it has been found that by using a solid weighting agent having such properties, such weighting agent does not interfere with seepage of oil through dehydration cracks in the consolidated filter cake, but actually assists in enabling the lubricating oil to effectively reach and lubricate the interface of the filter cake/stuck drill pipe, thereby reducing the frictional resistance in the spotted area and enabling the drill string to be freed.

Although it is not intended to limit the present invention by a particular theory or mechanism, it is believed that when an oil base fluid is spotted, the cake buildup across the cake/collar interface stops, except for residual cake at the cake/collar fillet which is not removed by displacement. Since oil will not penetrate the water base cake and the differential pressure is maintained, oil causes the water base cake to shrink and dehydration cracks develop. Oil seeps through these cracks and lubricates the collar surface thereby acting as a pipe freeing fluid reducing the pullout force required to free the pipe. The use of barite as a weighting agent is detrimental because it is believed that the barite plugs the dehydration cracks formed in the filter cake, resulting in increased frictional resistance and preventing oil from effectively lubricating the collar surface.

Moreover, it is believed that barite and other conventional drilling fluid solids interfere with the release mechanism involved with spotting fluids because such particles have a plate-like structure which causes them to plug the dehydration cracks and prevent oil from effectively lubricating the drill pipe surface. On the other hand, the spherical shape and characteristics of the weighting solids of the present invention tend to minimize compaction, and in view of the substantially spherical shape of such particles give point contact between the filter cake, the pipe and the individual spherical particles. By minimizing the contact area between the pipe and the filter cake, the weighting agents of the present invention act in a manner similar to ball bearings to minimize frictional resistance between the pipe and the filter cake enabling reduced frictional resistance in the area of cake/pipe contact and enabling the pipe to become free.

Any suitable weighting agent having the aforesaid characteristics may be effectively used in the method of the present invention. As especially preferred weighting agent in accordance with the present invention is sintered bauxite.

DESCRIPTION OF THE PREFERRED EMBODIMENTS

The solid spotting agent of the present invention is substantially spherical in shape and has a specific gravity in the range of from about 2.0 to about 7.0, preferably from about 3.5 to about 4.5 and is used in sufficient quantity to provide the spotting fluid with adequate density to reduce the tendency of the spotting fluid to migrate away from the area of the stuck drill pipe, i.e. the "stuck zone", and flow to the surface. Thus, a resulting spotting fluid should remain where placed in the hole and thus, its density should be slightly greater than the mud density to insure complete encirclement of the drill pipe. Suitable quantities of solid spotting agent are from about 32 to about 2600, preferably from about 200 to about 900 pounds of solid spotting agent per barrel of spotting fluid.

In addition, the solid spotting agent of the present invention must have a minimum compressive strength of at least that of silica sand, namely, in the range of from about 5,000 to about 100,000 psi, preferably from about 8,000 to about 40,000 psi, so as to minimize compaction under pressure and to retain its substantially spherical shape so that it can act in the nature of a ball bearing to minimize frictional resistance between the drill pipe and the filter cake.

The solid spotting agent of the present invention comprises particles which are substantially spherical, and preferably can have a roundness index of from about 0.8 to about 1.0, with an especially preferred roundness index of 1.0, so that the particles can function substantially as ball bearings in reducing the friction between the stuck drill pipe and the filter cake. The spotting agents of the present invention have an average particle diameter of below 212 microns, preferably from about 45 to about 175 or 212 microns, with from about 45 to about 63 microns being especially preferred. Unlike barite, the particles of the present invention do not plug the dehydration cracks in the filter cake and result in increased frictional resistance, but rather, lower the pullout forces required by minimizing the frictional forces between the filter cake and the drill pipe.

Examples of suitable hard spherical spotting agents include those made from steel, aluminum, Ottawa silica sand, glass, wallnut shells each of which can be uncoated or coated, for example, with a hard resinous material, or the like. "Ottawa silica sand" is a naturally occurring material found in Ottawa, Ill., and having a minimum sphericity of 0.6 Krum and used for oil well fracturing operations. It is mined in quarries, washed and can be screened to the desired size range. However, an especially preferred solid spotting agent is sintered bauxite, which is a polycrystalline material made primarily from finely divided natural bauxite which contains naturally occurring impurities and does not require the addition of sintering agents. It produces high strength sintered particles which are significantly less expensive than sintered alumina, for example.

Bauxite is a natural ore consisting mainly of alumina ($Al_2O_3$) and containing various impurities including iron oxide, aluminum silicate, titanium dioxide, quartz, and components of phosphorus and vanadium. The term "bauxite" as used herein refers to rocks of mineral deposits in which alumina predominates. Sintering of bauxite is a process by which particles in the natural ore are sized, compacted, and welded together at temperatures below the melting point of the material. By properly processing the bauxite ore and controlling the sintering process, particles of the desired size, shape and strength can be obtained.

It is preferred that the bauxite ore be first ground to a fine powder, compacted, and then sintered at conditions to produce a limited grain growth. The particle size distribution should fall in the 3 to 25 micron range and the particles should have a specific gravity greater than about 3.4. A preferred specific gravity range is from about 3.5 to about 3.8. It appears that high density, fine grain particles have higher compressive strength than sintered large grain particles.

The final particle size of the sintered product is normally slightly smaller than the agglomerated masses before sintering. The amount of shrinkage depends in part on the materials employed and the sintering techniques, but normally is between about 10 and 20 percent. The production of such sintered bauxite particles is described in U.S. Pat. No. 4,068,718, columns 3–6, the disclosure of which is hereby incorporated by reference.

The solid spotting agent particles of the present invention must be well rounded or substantially spherical in shape so as to avoid plugging dehydration cracks in the filter cake and to assist in reducing the frictional resistance between the filter cake and the stuck pipe. The sintering process can be controlled to produce generally spherical particles or the final product can be processed to produce a well rounded configuration.

A solid spotting agent for use in the present invention is a sintered bauxite sold by Carborundum Co. under the name of high-strength sintered bauxite. This material has the following typical chemical analysis:

| | |
|---|---|
| $Al_2O_3$ | 87.0% |
| $Fe_2O_3$ | 5.6% |
| $TiO_2$ | 4.3% |
| $MgO-C_aO$ | 0.4% |

The methods for sintering natural bauxite or bauxite mixtures are well known and are discussed in length in the literature, as for example, U.S. Pat. Nos. 3,079,243 and 3,491,492, which are hereby incorporated by reference.

The spotting fluid of the present invention comprises "oily material", preferably an oil-base fluid, and preferably comprises a hydrocarbon oil-base. The term "oily material" as used herein means a material having liophilic properties including hydrocarbon oils from natural sources, for example, diesel oil, mineral oil, etc., as well as oil-base resinous materials, such as polyanhydride resin which has both organophilic and hydrophilic constituents, such as PA-18, which is commercially available from Gulf Oil and Chemicals Company. The spotting fluid of the present invention can comprise, for example, from 20 to about 80, preferably from 20 to about 40 weight percent of said oily material.

The following examples illustrate the present invention and are not intended to limit the invention, but rather, are presented for purposes of illustration.

EXAMPLES 1-6

For comparative purposes, tests were conducted to determine the effect of various spotting agents upon pullout force reduction under identical conditions. Thus, tests were conducted using a fresh water base mud formulated and maintained in 30 gallon batches in an attempt to closely control mud properties.

The spotting fluid testing sequence involved mechanically holding a simulated drill collar in the stuck pipe testing apparatus while a filter was formed under static conditions so as to monitor drill collar position and movement, as well as filter cake compaction during testing, dial indicators and linear displacement transducers were used. Aluminum oxide cores having a spiral groove machined in them to simulate well bore irregularities and prevent the mud cake from sliding across the core surface were used. Testing was conducted with the apparatus oriented vertically at room temperature, 150° F. and 250° F. Differential pressures used were 900 psi and 840 psi.

The spotting fluid testing sequence involves mechanically holding the collar in the center of the core while a 3.2 millimeter thick filter cake is deposited on the hollow cylindrical core. The collar is then raised to contact the cake and released to allow sticking to occur. After compaction of the cake is completed (typically to 1.6 millimeters thickness) as indicated by dial indicators and motion transducers, the spotting fluid being tested is introduced into the model and allowed to remain in contact with the collar for a specified period of time depending upon the test temperature. After the spotting time elapsed, the collar was pulled free from the filter cake using a hydraulically operated cylinder. The pull-out force required to free the stuck pipe was used to compare various spotting agents tested.

Using the foregoing test procedure, four tests were conducted. The first test was a control and no spotting agent was used. The test was then repeated using barite, silica sand of 50-70 mesh, silica sand of 70-140 mesh, sintered bauxite of 40-70 mesh and sintered bauxite of 70-325 mesh particle size, respectively. The sintered bauxite utilized had a specific gravity of about 3.65 and a roundness index of 0.8 making it similar in roundness to the silica sand. However, the sintered bauxite is harder and more crush resistant than the sand.

The results are shown in the table set forth below:

TABLE

| Test No. | Spotting Agent | Average Pullout Force (Lbs.) |
|---|---|---|
| 1 | None | 2100 |
| 2 | Barite | 3800 |
|   | Silica Sand |  |
| 3 | 50-70 Mesh | 1200 |
| 4 | 70-140 Mesh | 1100 |
|   | Sintered Bauxite |  |
| 5 | 40-70 Mesh | 1160 |
| 6 | 70-325 Mesh | 1090 |

As seen in the table, the sintered bauxite and silica sand required a far lower pullout force to free the collar from the filter cake.

Moreover, close examination of the core using the barite indicated that the brite was plugging the dehydration cracks formed in the filter cake, resulting in increased frictional resistance and preventing oil from effectively lubricating the collar surface. On the other hand, the sintered bauxite did not plug the dehydration cracks formed in the filter cake, and, as indicated in the foregoing table, significantly reduced the pullout force required.

While the silica sand provided improved reduction in frictional resistance, it is not as desirable a spotting agent as is the sintered bauxite, since it is less crush resistant than bauxite and has a much lower specific gravity of 2.4, indicating that much more sand would be required on a volume basis to use in a spotting fluid as compared to the bauxite.

What is claimed is:

1. A method for freeing a drill string stuck in a well bore because of differential pressure effects, which comprises injecting a spotting fluid into said well bore in quantities sufficient to cover a section of said well bore at the zone where the drill string is stuck, said spotting fluid comprising an oily material containing a solid spotting agent, said solid spotting agent comprising at least 20 weight percent of said oily material and at least 32 pounds per barrel of said solid spotting agent, said solid spotting agent comprising substantially spherical particles having a specific gravity of at least 2.0, an average particle diameter below 212 microns, and a compressive strength of at least 5000 psi.

2. The method of claim 1 wherein said spotting fluid is introduced into said well bore by injecting said spotting fluid into drilling fluid introduced into said well bore after said drill string becomes stuck in said well bore, and removing said spotting fluid from said drilling fluid after said drill string becomes free.

3. The method of claim 1 wherein said spotting agent comprises particles of sintered bauxite, aluminum or steel.

4. The method of claim 1 wherein said spotting agent has a specific gravity of from 2.0 to about 7.0.

5. The method of claim 1 wherein said solid spotting agent has a compressive strength of from 5,000 to about 100,000 psi.

6. The method of claim 5 wherein said solid spotting agent has a compressive strength of from 8,000 to about 40,000 psi.

7. The method of claim 1 wherein said spotting fluid comprises an oil base spotting fluid comprising diesel oil or mineral oil.

8. The method of claim 1 wherein said solid spotting agent has an average particle diameter of from 45 microns to about 212 microns.

9. The method of claim 8 wherein said solid spotting agent has an average particle diameter of from 45 to 175 microns.

10. The method of claim 8 wherein said solid spotting agent has an average particle diameter of from 45 microns to about 63 microns.

11. The method of claim 1 wherein the spotting fluid comprises from about 20 to about 80 weight percent oily material.

12. The method of claim 11 wherein the spotting fluid comprises from about 20 to about 40 weight percent oily material.

13. The method of claim 1 wherein the spotting fluid comprises from 32 to about 2600 pounds per barrel of solid spotting agent.

14. The method of claim 13 wherein the spotting fluid comprises from 200 to about 900 pounds per barrel of solid spotting agent.

15. The method of claim 1 wherein filter cake has formed between said drill pipe and the formation through which said well bore passes, and said drill pipe is stuck because of differential pressure across said filter cake.

16. The method of claim 1 wherein said spotting agent is silica sand.

17. A method for freeing a drill string stuck in a well bore because of differential pressure effects, which comprises injecting a spotting fluid into said well bore in quantities sufficient to cover a section of said well bore at the zone where the drill string is stuck, said spotting fluid comprising an oily material containing a solid spottng agent, said solid spotting agent comprising at least 20 weight percent of said oily material and at least 32 pounds per barrel of said solid spotting agent, said solid spotting agent comprising substantially spherical particles of sintered bauxite having a specific gravity of at least 2.0, an average particle diameter below 212 microns, and a compressive strength of at least 5000 psi.

18. A method for freeing a drill string stuck in a well bore because of differential pressure effects, which comprises injecting a spotting fluid into said well bore in quantities sufficient to cover a section of said well bore at the zone where the drill string is stuck, said spotting fluid comprising an oily material containing a solid spotting agent, said solid spotting agent comprising at least 20 weight percent of said oily material and at least 32 pounds per barrel of said solid spotting agent, said solid spotting agent comprising substantially spherical particles having a specific gravity of from about 3.5 to about 4.5, an average particle diameter below 212 microns, and a compressive strength of at least 5000 psi.

* * * * *